United States Patent [19]

Hert et al.

[11] Patent Number: 5,104,940
[45] Date of Patent: Apr. 14, 1992

[54] THERMOPLASTIC ELASTOMER BASED ON ETHYLENE/ACRYLATE COPOLYMER AND POLYNORBORNENE

[75] Inventors: Marius Hert, Verneuil en Malatte; Christian Dousson, Nogent sur Oise, both of France

[73] Assignee: Atochem, France

[21] Appl. No.: 623,721

[22] PCT Filed: Apr. 12, 1990

[86] PCT No.: PCT/FR90/00269

§ 371 Date: Feb. 13, 1991

§ 102(e) Date: Feb. 13, 1991

[87] PCT Pub. No.: WO90/12844

PCT Pub. Date: Nov. 1, 1990

[30] Foreign Application Priority Data

Apr. 17, 1989 [FR] France .............................. 89 05051
Jul. 4, 1989 [FR] France .............................. 89 08986

[51] Int. Cl.$^5$ .................. C08L 23/26; C08L 33/08; C08L 45/00; C08K 5/01
[52] U.S. Cl. ................................ 525/210; 525/133; 525/194; 525/195; 524/518
[58] Field of Search ................. 525/210, 194; 524/518

[56] References Cited

U.S. PATENT DOCUMENTS 3,676,390  7/1972  Vergne et al. .
4,203,884  5/1980  Coran et al. .
4,990,559  2/1991  Shiraki et al. ........................ 525/210

FOREIGN PATENT DOCUMENTS 0070220  1/1983  European Pat. Off. .
2162526  2/1986  United Kingdom .

Primary Examiner—Carman J. Seccuro
Attorney, Agent, or Firm—Finnegan, Henderson, Farabow, Garrett & Dunner

[57] ABSTRACT

Compositions comprising a mixture of 20 to 30 parts by weight of polynorbornane, 80 to 30 parts by weight of a crystalline olefin-based polymer and a quantity of plasticizer for polynorbornane sufficient to lower its glass transition temperature to the range of rubbers. The crystalline olefin-based polymer is a polymer or mixture of polymers comprising 5 to 100 weight percent of a copolymer of ethylene and at least one alkyl acrylate the group of which contains 1 to 8 carbon atoms, said copolymer having a melt flow rate between 0.1 and 20 dg/min. and 0 to 95 weight percent of a copolymer of ethylene and at least one α-olefin containing at least 3 to 10 carbon atoms, said copolymer having a density between 0.89 and 0.93, a crystallinity between 15 and 50% and a melt flow rate between 0.5 and 15 dg/min. The composition of the invention is prepared by mixing a mixture of polynorbornane, plasticizer, ethylene/acrylate copolymer, crosslinking system and, if necessary, ethylene/α-olefin copolymer, at a sufficient temperature and for a sufficient length of time to crosslink the polynorbornane.

10 Claims, No Drawings

THERMOPLASTIC ELASTOMER BASED ON ETHYLENE/ACRYLATE COPOLYMER AND POLYNORBORNENE

The present invention relates to thermoplastic compositions and more particularly thermoplastic elastomeric compositions comprising mixtures of ethylene/acrylate copolymer and of polynorbornene.

Polymers of relatively high molecular weight are generally incompatible with each other. When two polymers of different kind are mixed the mixture generally has mediocre mechanical properties such as tensile strength and elongation at break. A pair of polymers is rarely sufficiently compatible to form a mixture having mechanical properties which are as good as those of the less strong one of the two. However, when two polymers are compatible, the resulting mixture can exhibit an advantageous combination of properties, that is to say that, besides good mechanical properties, it can also have other favorable characteristics.

Thus, U.S. Pat. No. 4,203,884 teaches that compositions comprising the mixture of a thermoplastic crystalline polyolefin, of polynorbornene and of a quantity of plasticizer for polynorbornene which is sufficient to lower its glass transition temperature to the rubber range have advantageous properties. More particularly, this document discloses compositions comprising a mixture of 75 to 10 parts by weight of polyolefin, 25 to 90 parts by weight of polynorbornene and, per 100 parts by weight of polynorbornene, 30 to 400 parts by weight of plasticizer, said compositions being elastoplastic, that is to say that they have elastomeric properties while being processable like thermoplastics. In the molten state, according to this technique, a part of the plasticizer can be present in the thermoplastic polyolefin phase. After cooling, the plasticizer migrates substantially from the crystalline polyolefin phase towards the polynorbornene phase to form part of the latter. In this way the plasticizer improves the thermoplasticity or the processability of the composition. As a general rule, for a given degree of thermoplasticity the composition requires proportionately less polyolefin the greater the quantity of plasticizer.

U.S. Pat. No. 4,203,884 also discloses compositions comprising a mixture of 10 to 90 parts by weight of crystalline polyolefin and of 90 to 10 parts by weight of crosslinked polynorbornene dispersed in the form of particles of small size and of plasticizer in a sufficient quantity to lower the glass transition temperature of the polynorbornene to the rubber range. Thus, the crosslinking of polynorbornene improves the property compromise of the composition, in particular the tensile strength, the solvent resistance and the high-temperature properties. Such compositions are obtained by a dynamic vulcanization process according to which a mixture of polynorbornene, plasticizer, polyolefin and crosslinking agents is kneaded at a sufficient temperature to crosslink the polynorbornene.

Among the thermoplastic crystalline polyolefins which can be employed according to U.S. Pat. No. 4,203,884 there may be mentioned poly-ethylene and polypropylene, the latter being preferred as confirmed by the comparison of the results illustrated by Tables 1 and 2 of the cited document. In fact, this document teaches that compositions comprising from 30 to 60 parts by weight of crosslinked polynorbornene and from 70 to 40 parts by weight of a polyethylene of density 0.960 g/cm$^3$ have:

a modulus at 100% elongation of at least 6.8 MPa, that is to say too high, and an elongation at break not exceeding 220° C., that is to say too low for the majority of the applications for thermoplastic elastomers.

The Applicant's experiments have shown, moreover, that these same compositions have a residual compression deformation which is too high and a Shore A hardness which is too high for the majority of the applications for thermoplastic elastomers.

The problem which the present invention is aiming to solve consists, therefore, in choosing from the vast range of ethylene polymers a polymer capable of contributing an advantageous property comprise to an elastoplastic composition based on polynorbornene and plasticizer, making it suitable for the majority of the applications for thermoplastic elastomers and in particular:

a Shore A hardness not exceeding 65, an elongation at break which is not less than 230%, a modulus at 100% elongation which is not higher than 6 MPa and preferably not higher than 3 MPa, and a residual compression deformation (measured at 70° C. after 22 hours) not exeeding 47%.

The Applicant has demonstrated that this objective can be achieved by resorting to an ethylene/acrylate copolymer.

More precisely, the subject of the present invention is a composition comprising a mixture of approximately 20 to 70 parts by weight of polynorbornene, of approximately 80 to 30 parts by weight of an olefin-based crystalline polymer and of a quantity of plasticizer for polynorbornene which is sufficient to lower its glass transition temperature to the rubber range, wherein the olefin-based crystalline polymer chosen is a polymer or a mixture of polymers comprising:

from 5 to 100% by weight of a copolymer of ethylene and of at least one alkyl acrylate in which the group has from 1 to 8 carbon atoms, said copolymer having a melt index of between 0.1 and 20 dg/min, and from 0 to 95% by weight of a copolymer of ethylene and of at least one α-olefin containing from 3 to 10 carbon atoms, said copolymer having a relative density of between 0.89 and 0.93, a crystallinity of between 15 and 50% and a melt index of between 0.5 and 15 dg/min.

The ethylene/acrylate copolymers forming a part of the composition of the crystalline polyolefin are well known to a person skilled in the art and can be prepared by various processes, especially at high pressure and at elevated temperature. They preferably contain from 0.5 to 10 mol % of units derived from the acrylate. Among the acrylates which may form part of the constitution of these copolymers very particular mention will be made of methyl, ethyl, isopropyl, n-butyl, isobutyl, tert-butyl and 2-ethylhexyl acrylates.

A polynorbornene within the meaning of the present invention means an amorphous polymer or copolymer of bicyclo[2,2,1]-2-heptene and of its substituted derivatives such as are described in U.S. Pat. No. 3,676,390. Among the plasticizers for polynorbornene which can lower its glass transition temperature to the rubber range there may be mentioned the petroleum-derived heavy aromatic, naphthenic or paraffinic oils with a freezing point lower than 0° C. and a flash point higher than 180° C. and phthalic acid diesters such as dioctyl or didodecyl phthalates. These plasticizers can be employed pure or mixed.

The ethylene/α-olefin copolymers present in the composition according to the invention are well known to a person skilled in the art and can be prepared by various processes, either at low pressure and moderate temperature or at high pressure and elevated temperature. Corresponding to the density range shown, their molar content of α-olefin is generally between 1 and 10% depending on the nature of the α-olefin. Among the α-olefins which can form part of the constitution of these copolymers, very particular mention will be made of propylene, 1-butene, 1-hexene, 4-methyl-1-pentene and 1-octene. Among the ethylene/α-olefin copolymers which may be employed according to the present invention those advantageously preferred are ethylene/propylene/1-butene terpolymers and copolymers of ethylene and of higher α-olefins (that is to say those containing at least 4 carbon atoms) in accordance with European Patent No. 070,220. The latter are copolymers of particularly pronounced macromolecular heterogeneity, that is to say ones in which the α-olefin content can depart markedly, depending on the crystalline or amorphous fractions in which it is measured, from the average α-olefin content in the copolymer. In some copolymers of this type the heterogeneity can be such that the α-olefin content in a crystalline fraction is 1/10 (one tenth) of the average content and that the α-olefin content in an amorphous fraction is up to 5 times the average content. Furthermore, such heterogeneous copolymers are advantageously such that their crystalline fractions show a single melting peak at a temperature of between 116° and 130° C. Among their other preferred characteristics there may be mentioned:

a total unsaturation content of between 0.25 and 0.50 double bonds per 1000 carbon atoms,
a polydispersity index between 3 and 9 when the copolymer contains only one α-olefin, between 6 and 12 when the copolymer contains at least two α-olefins,
a number-average molecular weight $M_n$ of between 12,000 and 60,000.

In order to improve the property compromise of the compositions according to the invention it is advantageous to carry out the crosslinking of the polynorbornene, for example, using a dynamic vulcanization process. The second subject of the present invention is therefore a thermoplastic composition comprising a mixture of approximately 20 to 70 parts by weight of crosslinked polynorbornene, of approximately 80 to 30 parts by weight of an olefin-based crystalline polymer and of a quantity of plasticizer for polynorbornene which is sufficient to lower its glass transition temperature to the rubber range, wherein the olefin-based crystalline polymer chosen is a polymer or a mixture of polymers containing:

from 5 to 100% by weight of a copolymer of ethylene and of at least one alkyl acrylate in which the group has from 1 to 8 carbon atoms, said copolymer having a melt index of between 0.1 and 20 dg/min, and
from 0 to 95% by weight of a copolymer of ethylene and of at least one α-olefin containing from 3 to 10 carbon atoms, said copolymer having a relative density of between 0.89 and 0.93, a crystallinity of between 15 and 50% and a melt index of between 0.5 and 15 dg/min.

The ethylene/α-olefin copolymer and the ethylene/alkyl acrylate copolymer which are present in the thermoplastic composition according to the invention have already been described in detail above when dealing with the compositions containing a non-crosslinked polynorbornene. In the thermoplastic compositions according to the invention the crosslinked plasticized polynorbornene is advantageously in the form of dispersed small particles, which allows the composition to be converted and processed like any thermoplastic material.

In general, the crosslinking systems which are suitable for the vulcanization of diene rubber can be employed for crosslinking the polynorbornene in the thermoplastic compositions according to the invention. Among the satisfactory crosslinking agents for rubbers there may be mentioned vulcanizing agents based on sulfur, peroxide, phenolic resin, azo, maleimido, quinoid and urethane compounds such as, for example, free sulfur or sulfur-donating compounds like tetramethylthiuram disulfide, thiuram disulfide, benzothiazyl disulfide and dipentamethylenethiuram hexasulfide or m-phenylenebismaleimide, benzoquinone dioxime, lead peroxide, di-orthotolylguanidine, 4,4,-dithiodimorpholine and the like. These vulcanizing agents can be advantageously employed in combination with at least one vulcanization activator or accelerator such as zinc oxide, magnesium oxide, benzothiazole sulfamide, tin chloride, zinc dibutyldithiocarbamate, zinc phenylethyldithiocarbamate, tellurium ethyldithiocarbamate and the like. When free sulfur or a sulfur-donating compound is employed as a vulcanizing agent, it is preferable to employ a large quantity of vulcanization activator or accelerator, that is to say, for example, a weight of activator or accelerator which is approximately between 1 and 3 times the weight of vulcanizing agent.

The constituents of the crosslinking system, and especially the vulcanizing agent, are employed in the usual proportions known to a person skilled in the art for obtaining a virtually complete crosslinking of polynorbornene without, however, reducing its elasticity to the point where it is no longer rubbery. In the thermoplastic compositions according to the invention the polynorbornene is preferably crosslinked to the point where not more than approximately 10%, preferably not more than approximately 5%, of the polynorbornene can be extracted with a solvent such as boiling xylene, in which non-crosslinked polynorbornene is completely soluble, as is the ethylene/α-olefin copolymer and the ethylene/alkyl acrylate copolymer. This extraction test makes it possible to check on the run that the ethylene/acrylate copolymer and, where appropriate, the ethylene/α-olefin copolymer have not themselves been substantially crosslinked, which would have a detrimental effect on the thermoplasticity of the composition.

For some applications of the compositions according to the invention, their tensile strength and/or the oil resistance can be improved without, however, spoiling the favorable compromise of properties described above, by partially replacing the ethylene/α-olefin copolymer with an essentially propylene-based crystalline polymer. According to this alternative form of the invention, up to 60% by weight and preferably up to 40% by weight of the ethylene/α-olefin copolymer is replaced with a polymer of melt index of between 0.3 and 10 dg/min (determined according to ASTM Standard D 1238 at 230° C. under 2.16 kg), containing at least 80 mol % of propylene-derived units and not more than 20 mol % of units derived from a comonomer chosen from ethylene and α-olefins containing from 4 to 12 carbon atoms. Said polymer is crystalline in nature and is preferably isotactic when it consists solely of units derived from propylene.

Finally, for applications in which a high ozone and/or thermal aging resistance are sought after, the compositions according to the invention may comprise an olefinic elastomer, the latter being a partial replacement for polynorbornene, such that it can replace up to a third of the weight of the polynorbornene which is present. As an olefinic elastomer capable of being employed in the compositions according to the invention there may be mentioned especially an ethylene terpolymer with at least one α-olefin containing from 3 to 6 carbon atoms and at least one diene. More particularly, preference is given to ethylene-propylene-diene terpolymers, the diene being chosen from conjugated or unconjugated linear or cyclic dienes such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)-2-norbornene, 1,5-cyclooctadiene, bicyclo-[2,2,2]-2,5-octadiene, cyclopentadiene, 4,7,8,9-tetrahydroindene and isopropylidenetetrahydroindene. Such elastomeric terpolymers which may be employed in accordance with the present invention generally comprise approximately between 15 and 60 mol % of propylene-derived units and approximately between 0.1 and 20 mol % of units derived from the diene.

The properties of the compositions according to the invention can be advantageously modified for the purposes of certain special utilizations, by adding conventional ingredients such as:

white (titanium oxide) or colored pigments,
coupling agents such as silanes or titanates,
degradation inhibitors such as, for example, the zinc salt of mercaptobenzimidazole,
stabilizers such as, for example, polymerized 2,2,4-trimethyl-1,2-dihydroquinoline,
processing aids such as long-chain aliphatic amines, stearic acid salts, and the like,
pulverulent fillers such as carbon black, silica, kaolin, alumina, clay, aluminosilicate, talc, carbonate, and
lubricants, such as stearic acid.

In particular, the addition of pulverulent fillers has the effect of improving the tensile strength and, in some cases, the elongation at break of the thermoplastic composition according to the invention. The quantity of filler which may be incorporated in the composition can be up to 150 parts per 100 parts by weight of polynorbornene, this quantity being obviously variable depending on the nature of the filler.

The thermoplastic compositions according to the invention in which the polynorbornene is crosslinked, are preferably prepared by dynamic vulcanization, that is to say by kneading a mixture of polynorbornene, plasticizer, ethylene/acrylate copolymer, crosslinking system (such as defined above) and, where appropriate, ethylene/α-olefin copolymer at a sufficient temperature and for a sufficient period to crosslink the polynorbornene. The kneading can be carried out in a conventional apparatus such as, for example, a Banbury mixer, a Brabender mixer, a Rheocord mixer or an extruder, at a temperature of approximately between 110° and 220° C. for a period of approximately between 3 and 15 minutes, this time being proportionately shorter the higher the temperature. Before this kneading stage the mixture may be prehomogenized in an internal mixer at a moderate temperature of approximately between 60° and 120° C.

The compositions according to the invention can be employed for manufacturing finished products and industrial articles using extrusion, injection molding and compression molding techniques.

In particular they can be extruded on extruders of the same type as those commonly employed for polyolefins, that is to say those having a screw length/diameter ratio which is generally approximately between 18 and 28 and a compression ratio which is preferably close to 3.0. The temperature profile displayed along the screw is generally fairly flat, the temperature difference between the entry and the die being approximately from 10° C. to 20° C. The temperature of the composition in the extruder (stock temperature) may be approximately between 150° C. and 220° C., preferably between 160° and 180° C. These extruders are fitted with profile dies (for example industrial carpentry profiles). The extrusion speed is approximately between 15 and 50 meters per minute and the extrudate undergoes practically no drawing on leaving; it is cooled in a bath of water and runs over a drawing bench whose speed is generally approximately between 100% and 110% of the extrusion speed.

The compositions according to the invention can also be injection-molded by means of injection presses of the same time as those commonly employed for high- and low-density polyethylene and polypropylene. The temperature of the material in the press, which is a function of the proportion of plasticizer in the composition, is generally approximately between 120° C. and 200° C. This temperature is proportionately lower the higher the proportion of plasticizer. It is generally appropriate to employ an injection pressure which is markedly higher than the working pressure, so as to increase the fluidity of the stock during the injection. By way of example, it will be possible to employ an injection pressure of 700 bars when the operating pressure is 150 bars. The speed of the plasticizing screw can commonly reach approximately 100 to 200 revolutions per minute. Depending on the required injection rate, the mold temperature can be chosen approximately between $-10°$ C. and $+40°$ C.

Concrete applications of the compositions according to the invention include especially flexible tubing, seals for the building and automobile industries, protective bellows for the automobile industry, injected articles such as solid wheels for the toy industry, and the like.

The examples below are given by way of illustration without limiting the present invention.

EXAMPLE 1

Comparative

In a first stage polynorbornene is formulated with a plasticizer, a filler, a degradation inhibitor, a vulcanizing agent, a pigment and a lubricant, in an internal mixer rotating at 100 revolutions/min and controlled at 80° C., for 6 minutes, and the formulation obtained is then converted into sheet form by running on a roll mill controlled at 60° C., on which a vulcanization accelerator is added. In a second stage the rubber mass has a crystalline polyolefin added to it and is taken up on a Brabender mixer rotating at 90 revolutions/min at a temperature of 80° C. for 8 minutes. The resulting composition is recovered and compression-molded into 2.5 mm plaques, on which the following properties are measured:

Shore A hardness, determined according to ASTM Standard D 2240, elongation at break, expressed in % and determined according to ASTM Standard D 412, modulus at 100% elongation, expressed in MPa and determined according to ASTM Standard D 412, elongation set, expressed in % and determined according to ASTM Standard D 412 (after an elongation of 100%).

Finally, the residual compression deformation (RCD) over 22 hours at 70° C. is measured on 12.5-mm blocks compressed by 25%, determined according to ASTM Standard D 395 and expressed in %. In this comparative example:

the crystalline polyolefin is a polyethylene in accordance with the teaching of U.S. Pat. No. 4,203,884, with a relative density of 0.962 and a melt index of 5.3 dg/min, marketed by Solvay under the name Eltex A 1050° F., the polynorbornene employed is marketed by the Applicant under the name Norsorex, the plasticizer is a paraffinic oil with a flash point of 225° C. and a freezing point of −10° C., marketed by Exxon under the name Flexon 876, the pulverulent filler is calcined clay, the degradation inhibitor is the zinc salt of mercaptobenzimidazole marketed by Safic-Alcan under the name ZMBI, the vulcanizing agent is a phenolic resin of formula:

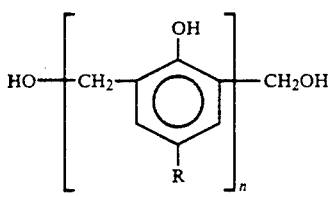

in which n=4 or 5 and R denotes an alkyl radical, marketed by Schenectady under the name SP 1045, the heat stabilizing agent is a chlorosulfonated polyethylene elastomer marketed by De Pont De Nemours under the name Hypalon 20, the vulcanization accelerator is a mixture of equal weights of stannous chloride $SnCl_2.2H_2O$ and of zinc oxide, the pigment is titanium oxide, and the lubricant is stearic acid.

The weight quantities of the various ingredients of the composition are shown in the table below, together with the results of measurements of properties, carried out as described above.

EXAMPLES 2 and 3

By operating under the same conditions as in Example 1 and employing the same ingredients, with the exception of the nature of the olefin-based crystalline polymer and, in the case of Example 3, of the plasticizer, different compositions are prepared, whose properties are shown in Table I below.

The olefin-based crystalline polymer employed is an ethylene/n-butyl acrylate copolymer of relative density 0.930, with a melt index of 0.65 dg/min and containing 7.3% by weight of n-butyl acrylate.

The plasticizer employed in Example 3 is a mixture containing, by weight, two thirds of Flexon 876 paraffinic oil and one third of dioctyl phthalate.

TABLE 1

| Example | 1 | 2 | 3 |
|---|---|---|---|
| Polynorbornene | 55.4 | 44.4 | 70 |
| Plasticizer | 83.2 | 83.2 | 105 |
| Filler | 22.2 | 22.2 | 28 |
| Degradation inhibitor | 1.1 | 1.1 | 1.4 |
| Vulcanizing agent | 12.1 | 12.1 | 16.8 |
| Pigment | 5.5 | 5.5 | 7 |
| Lubricant | 0.6 | 0.6 | 0.7 |
| Vulcanization accelerator | 5.0 | 5.0 | 6.4 |
| Olefin-based crystalline polymer | 44.6 | 44.6 | 30 |
| Shore A hardness | 78 | 63 | 40 |
| Elongation at break | 190 | 240 | 330 |
| Modulus at 100% elongation | 7.8 | 1.7 | 0.8 |
| Elongation Set | 26 | 20 | 17 |
| R C D | 49 | 41 | 47 |

EXAMPLES 4 and 5

In a first stage polynorbornene is formulated with a plasticizer, a filler, a degradation inhibitor, a vulcanizing agent and a lubricant, in an internal mixer rotating at 100 revolutions/min and controlled at 80° C., for 6 minutes, and the formulation obtained is then converted into sheet form by running on a roll mill controlled at 60° C., on which a vulcanization accelerator is added.

In a second stage the rubber mass has an ethylene/α-olefin copolymer and an ethylene/acrylate copolymer added to it and is taken up on a Brabender mixer rotating at 90 revolutions/min at a temperature of 180° C. for 8 minutes. The resulting composition is recovered and compression-molded into 2.5-mm plates, on which the following properties are measured:

Shore A hardness determined according to ASTM Standard D 2240, elongation at break, expressed in % and determined according to ASTM Standard D 412, plasticizer exudation, determined by feeling the molded plaques 8 days after their manufacture.

In these examples:

the ethylene/α-olefin copolymer is an ethylene/1-butene copolymer of relative density 0.910, which has a melt index of 1 dg/min and a crystallinity of 30%, marketed under the name Norsoflex FW 1600, the ethylene/acrylate copolymer is a copolymer containing 15% by weight of methyl acrylate and has a melt index of 0.3 dg/min, the polynorbornene employed is marketed by the Applicant under the name Norsorex, the plasticizer is a naphthenic oil with a flash point of 195° C., marketed by Texaco under the name Dealen RD 25, the pulverulent filler is calcined kaolin, the lubricant is stearic acid, the vulcanizing agent is a mixture of equal weights of tetramethylthiuram disulfide and 4,4'-dithiodimorpholine, the vulcanization accelerator is a mixture of zinc dibutylcarbamate, zinc phenylethylcarbamate, tellurium ethyldithiocarbamate and zinc oxide in weight ratios of 2/0.5/1/3, the stabilizer is a product marketed by Bayer under the name Vulkalent E.

The weight quantities of the various ingredients of the composition are shown in Table II below, together with the results of measurements of properties, carried out as described above.

TABLE 2

| Example | 4 | 5 |
|---|---|---|
| Polynorbornene | 35 | 40 |
| Plasticizer | 79 | 90 |
| Filler | 35 | 40 |
| Vulcanizing agent | 1.0 | 1.0 |
| Lubricant | 0.5 | 0.5 |
| Vulcanization accelerator | 2.2 | 2.6 |
| Ethylene/α-olefin copolymer | 37 | 43 |
| Ethylene/acrylate copolymer | 28 | 17 |
| Shore A hardness | 64 | 60 |
| Elongation at break | 350 | 300 |
| Exudation | none | none |

We claim:

1. A composition comprising a mixture of 20 to 70 parts by weight of polynorbornene, of 80 to 30 parts by weight of an olefin-based crystalline polymer and of a quantity of plasticizer for polynorbornene which is sufficient to lower its glass transition temperature to the rubber range, wherein the olefin-based crystalline polymer chosen is a polymer or a mixture of polymers comprising:
   from 5 to 100% by weight of a copolymer of ethylene and of at least one alkyl acrylate in which the group has from 1 to 8 carbon atoms, said copolymer having a melt index of between 0.1 and 20 dg/min, and
   from 0 to 95% by weight of a copolymer of ethylene and of at least one α-olefin containing from 3 to 10 carbon atoms, said copolymer having a relative density of between 0.89 and 0.93, a crystallinity of between 15 and 50% and a melt index of between 0.5 and 15 dg/min.

2. A thermoplastic composition comprising a mixture of 20 to 70 parts by weight of crosslinked polynorbornene, of 80 to 30 parts by weight of an olefin-based crystalline polymer and of a quantity of plasticizer for polynorbornene which is sufficient to lower its glass transition temperature to the rubber range, wherein the olefin-based crystalline polymer chosen is a polymer or a mixture of polymers comprising:
   from 5 to 100% by weight of a copolymer of ethylene and of at least one alkyl acrylate in which the group has from 1 to 8 carbon atoms, said copolymer having a melt index of between 0.1 and 20 dg/min, and
   from 0 to 95% by weight of a copolymer of ethylene and of at least one α-olefin containing from 3 to 10 carbon atoms, said copolymer having a relative density of between 0.89 and 0.93, a crystallinity of between 15 and 50% and a melt index of between 0.5 and 15 dg/min.

3. The thermoplastic composition as claimed in claim 2, wherein the polynorbornene is crosslinked to the point where not more than 10% of the polynorbornene can be extracted with a solvent.

4. The composition as claimed in one of claims 1 to 3, wherein the copolymer of ethylene and of at least one alkyl acrylate contains from 0.5 to 10 mol % of units derived from the acrylate.

5. The thermoplastic composition as claimed in claim 2, which additionally contains at least one additive chosen from white or colored pigments, coupling agents, degradation inhibitors, stabilizers, processing aids, pulverulent fillers and lubricants.

6. The thermoplastic composition as claimed in claim 5, wherein the said additive is a pulverulent filler employed in a proportion of up to 150 parts per 100 parts by weight of polynorbornene.

7. The thermoplastic composition as claimed in claim 2, which has:
   a Shore A hardness not exceeding 65,
   an elongation at break which is not lower than 230%,
   a modulus at 100% elongation which is not higher than 6 MPa and
   a residual compression deformation (measured at 70° C. after 22 hours) not exceeding 47%.

8. A process for the preparation of a thermoplastic composition as claimed in claim 2, wherein a mixture of polynorbornene, plasticizer, ethylene/acrylate copolymer, crosslinking system and where appropriate, ethylene/α-olefin copolymer is kneaded at a sufficient temperature and for a sufficient period to crosslink the polynorbornene.

9. The process as claimed in claim 8, wherein the kneading is carried out at a temperature of between 110° and 220° C.

10. The process as claimed in either of claims 8 or 9, wherein the kneading is carried out for a period of between 3 and 15 minutes.

* * * * *